United States Patent
White

[15] 3,693,798
[45] Sept. 26, 1972

[54] AQUARIUM FILTER DEVICE

[72] Inventor: Eugene B. White, Oak Park, Ill.

[73] Assignee: Ken-Flo Products Corporation, Palos Heights, Ill.

[22] Filed: Dec. 1, 1969

[21] Appl. No.: 881,110

[52] U.S. Cl. .................................................210/169
[51] Int. Cl. ...............................................E04h 3/20
[58] Field of Search ............................210/169; 119/5

[56] References Cited

UNITED STATES PATENTS

| | | | |
|---|---|---|---|
| 3,135,238 | 6/1964 | Eyl | 119/5 |
| 3,516,544 | 6/1970 | Sesholtz | 210/169 |
| 2,783,893 | 3/1957 | Romanoff | 210/169 X |
| 3,485,373 | 12/1969 | Powers | 210/169 |
| 3,490,416 | 1/1970 | Kelley et al. | 210/169 X |

Primary Examiner—Reuben Friedman
Assistant Examiner—T. A. Granger
Attorney—Hill, Sherman, Meroni, Gross & Simpson

[57] ABSTRACT

A method and system for the treatment of water in aquariums and the like utilizing aerobic action in which the water is withdrawn from the main body, exposed to the atmosphere, filtered and returned under pressure to the main body from below the same, the preferred embodiment of apparatus comprising a filter structure disposed exteriorly of the aquarium water and supplied therefrom, with the filtered water being conducted to means disposed at the bottom of the aquarium constructed to support a layer of gravel or other discrete material thereon for discharge below such layer of discrete material, flowing therethrough under pressure.

9 Claims, 9 Drawing Figures

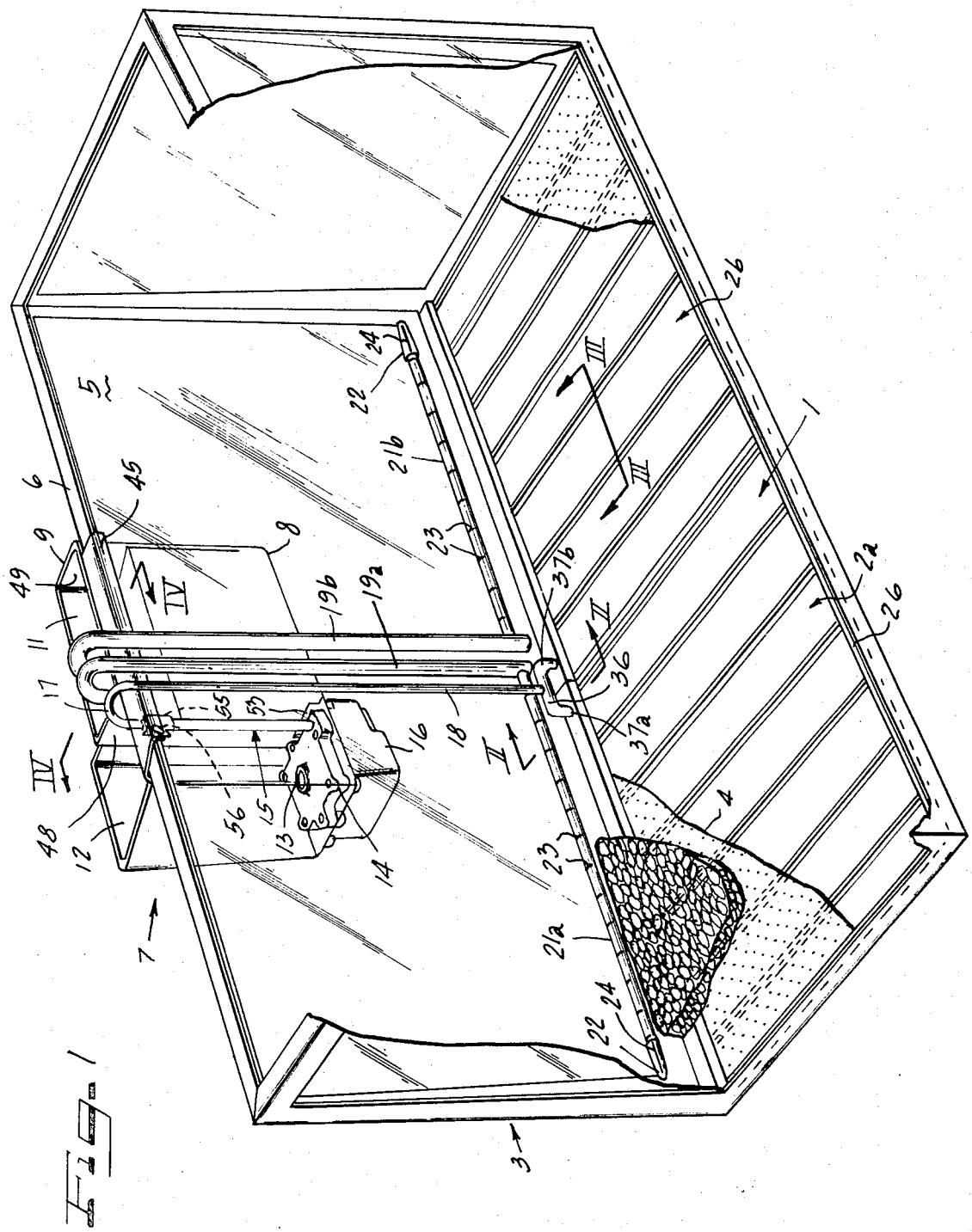

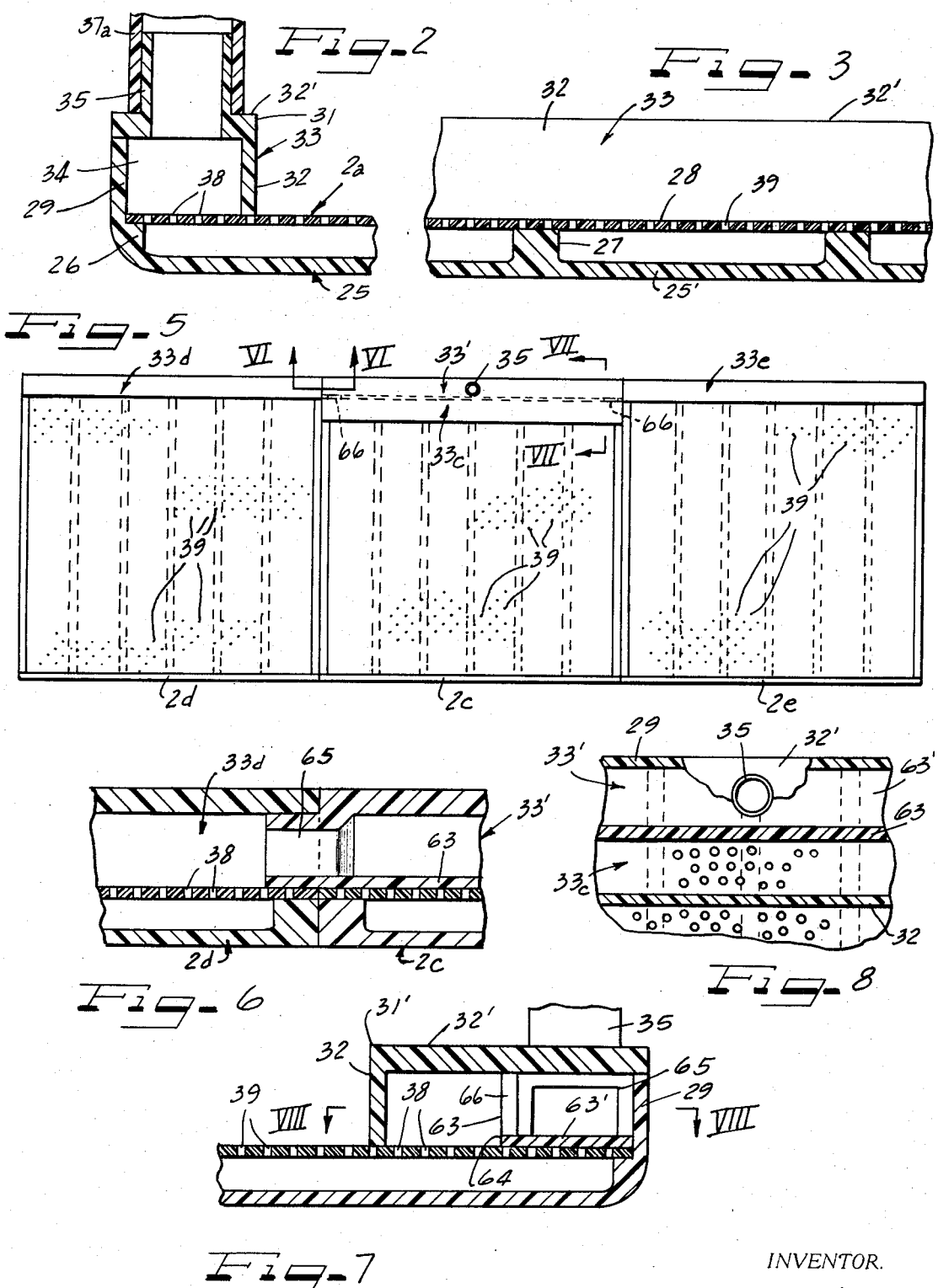

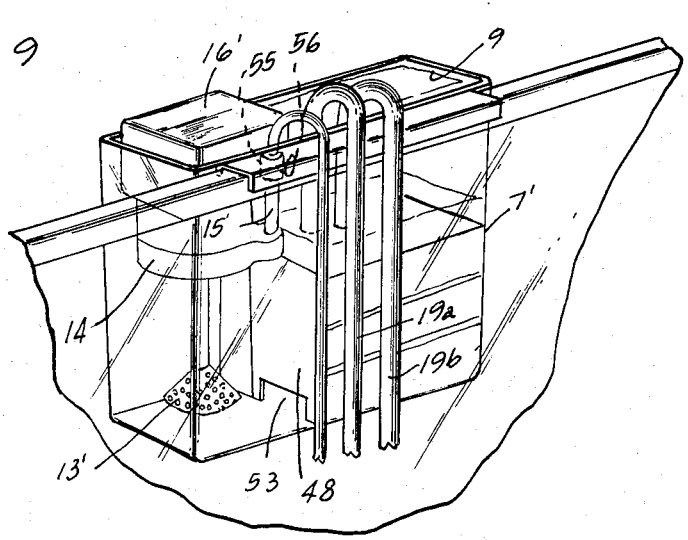
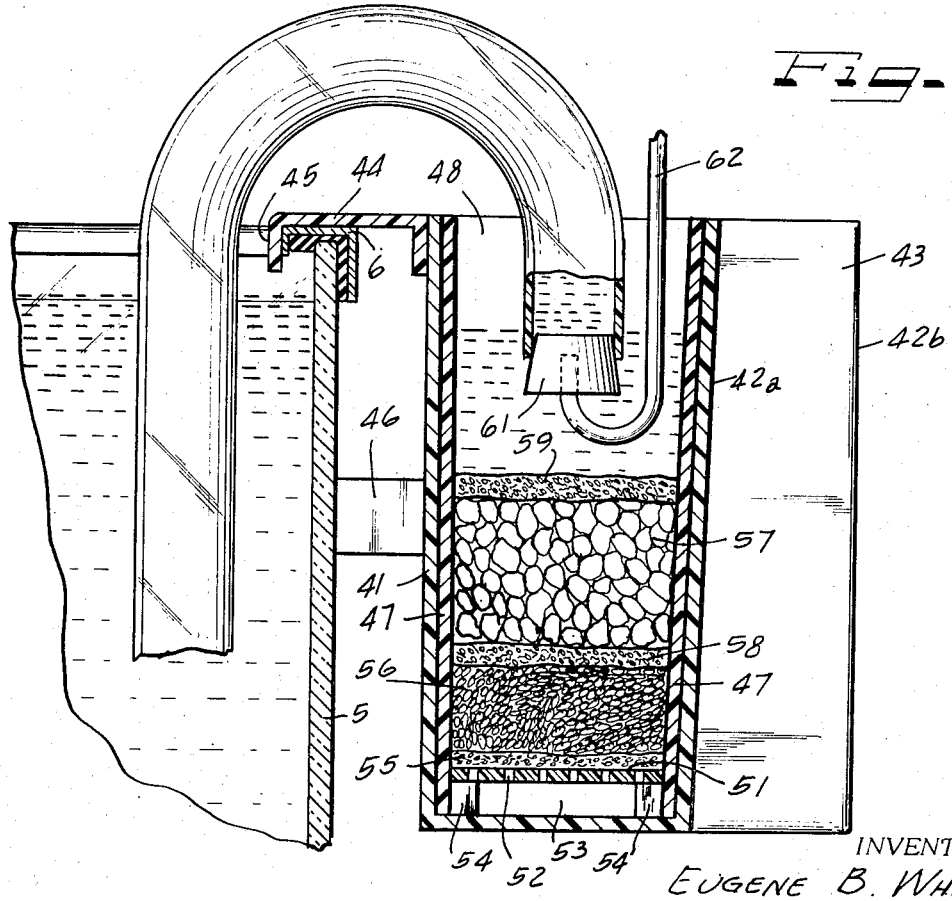
INVENTOR.
EUGENE B. WHITE

AQUARIUM FILTER DEVICE

BACKGROUND OF THE INVENTION

The invention is directed to a water purification system particularly for application in aquariums and the like, and may employ a filter structure which may be very similar in construction to that illustrate in my co-pending application, Ser. No. 805,274, filed on Mar. 7, 1969 now U.S. Pat. No. 3,578,169, in particular utilizing a replaceable filter cartridge.

As pointed out in said application simple filter structures utilizing charcoal or the like have been employed in small aquariums, for example from 5 to 40 gallons capacity, the filter structure usually being disposed in the aquarium and the water circulated through the filter by means of a small air pump operative to simultaneously provide aeration of the water. The filter system illustrated in said co-pending application, as therein pointed out, while involving an aerobic action, is designed to make use of an aerobic action in which debris and organic matter in the water settles to the bottom of the tank into the gravel or other discrete material forming the normal lower water level in the tank. A tray-like structure was provided which upon was initially disposed a layer of discrete filter material which carried a layer of the usual aquarium gravel. In this construction, the water was withdrawn from below the tray-like structure and conducted to the filter from which the filtered water was discharged directly into the top of the aquarium tank. While some purification may have resulted from the oxidizing action on organic matter present as a result of the oxygen content within the water drawn through the aquarium gravel, which oxidation would take place primarily at the interface between the gravel layer and the layer of filter material therebelow, the primary action was an aerobic in character, taking place in the filter bed, whereby organic compounds were decomposed into gases with the contaminated water being then conducted to the filter and subsequently returned to the tank.

The present invention is directed to a method and apparatus utilizing biofiltration (continuous recirculation at a high volume through a shallow filter bed) as the primary purification whereby settling and accumulation of material carried in the water at the bottom of the tank is completely eliminated.

The present invention therefore is directed to an improved water purification system for aquariums and the like, utilizing aerobic action and eliminating the disadvantages of prior aquarium filtering systems, including that illustrated in my co-pending application above referred to.

BRIEF SUMMARY OF THE INVENTION

The invention is directed to a method of purifying water in aquariums and the like, and to apparatus for practicing the same, in which the water containing the debris and material to be removed therefrom is withdrawn from the main body of water above the bottom thereof, and is filtered as well as being subjected to the atmosphere to absorb oxygen, following which the filtered water is returned under pressure to the aquarium tank and discharged into the main body of water from below the latter. A layer of discrete material such as the usual aquarium gravel is disposed adjacent the bottom of the tank but spaced upwardly therefrom by suitable means whereby the filtered water flows below such gravel layer and is discharged upwardly therethrough, the rate of return of the filtered water being adjustably selected to insure adequate water circulation within the main body. The rate of flow is so selected that the water flow through the filter and thus returned to the tank is such that a volume of water equal to that of the tank may be filtered in a period of, for example, from 10 to 60 minutes. At high rates such as this, adequate aeration of the water takes place from exposure to the atmosphere occuring in the filter structure and the oxygen carrying filtered water thus is discharged at a high volume at the bottom of the tank, with the gravel cooperating with the supporting structure therefor to provide a very effective distribution of the filtered water throughout the tank bottom, whereby such water is discharged in quantities sufficient to insure adequate purification of the water as well as the rapid conduction of all debris and foreign matter in the water into the external filter structure.

As a result, any foreign material in the water at any particular instant is so small in quantity that it will not be apparent from visual observation and the tank water will continuously maintain a clarity and degree of purity that heretofore was not considered possible to achieve. Consequently, the tank is continuously kept in a clean condition and it is usually unnecessary to remove and clean the gravel or periodically refill the tank, only adding make-up water to compensate for evaporation, etc.

The apparatus for practicing the invention, in the preferred form illustrated in the drawings, comprises an external filter structure, constructed with a removable and placeable filter cartridge, somewhat similar in general construction to that illustrated in my co-pending application, with water being withdrawn from the tank at a location above the upper surface of the gravel and discharged into the filter structure, from which it is withdrawn by means of a small pump and returned, under pressure, to the bottom of the tank which is provided with a gravel supporting structure constructed to receive the filtered water and discharge the same upwardly through the gravel disposed on such structure. Thus, no specific filtering material is disposed at the bottom of the tank, with the aerobic purifying action taking place directly in the main body of the water and in the external filter structure.

In the specific embodiment of the invention illustrated, the water is withdrawn from the tank and discharged into the filter structure by means of a syphon action with the filtered water being discharged from the filter structure by means of a small electric pump which returns the water, under pressure, to the tank.

BRIEF DESCRIPTION OF THE DRAWINGS

Other objects, features and advantages of the invention will be readily apparent from the following description of a preferred embodiment taken in conjunction with the accompanying drawings, wherein like reference characters indicate like or corresponding parts, although variations and modifications may be effected without departing from the spirit and scope of the novel concepts of the disclosure, and in which:

FIG. 1 is a perspective view of a filter system embodying the present invention, illustrating its installation in aquarium tank, portions of the latter being broken away to illustrate details of the invention;

FIG. 2 is a sectional view taken approximately on the line II—II of FIG. 1;

FIG. 3 is a sectional view taken approximately on the line III—III of FIG. 1;

FIG. 4 is a sectional view through the filter structure taken approximately on the line IV—IV of FIG. 1;

FIG. 5 is a top plan view of a modified form of gravel supporting structure;

FIG. 6 is a sectional view taken approximately on the line VI—VI of FIG. 5;

FIG. 7 is a sectional view taken approximately on the line VII—VII of FIG. 5;

FIG. 8 is a sectional view taken approximately on the line VIII—VIII of FIG. 7; and FIG. 9 is a perspective view of a modified form of filter structure.

DETAILED DESCRIPTION OF THE INVENTION

For clarity the description will be presented in three parts, the first being general and briefly covering the basic components, the second being a detailed description of the gravel supporting and water discharge structure, the third including details of the external filter structure and pump, and the fourth including details of modified constructions of the gravel supporting structure and the external filter structure.

GENERAL CONSTRUCTION

Referring to FIG. 1, the reference numeral 1 indicates generally a gravel supporting structure, illustrated as comprising two sections 2a and 2b which are adapted to be placed on the bottom of the aquarium tank, indicated generally by the numeral 3, with the tray structures 2 being adapted to support a layer of gravel or other discrete material 4 in spaced relation above the tank bottom.

Disposed at the exterior of the rear wall 5 of the tank and supported on the upper edge 6 thereof is a filter structure, indicated generally by the numeral 7, comprising a hollow body member for casing 8 constructed to receive and support a filter cartridge 9. This cartridge 9 is in the form of a container which is open at the top, to form an inlet chamber at the top of the filter cartridge. Water passing through the filter cartridge 9 flows into a chamber or well 12 where it enters the inlet opening 13 of a centrifugal pump 14 having a discharge outlet to which is connected vertically extending conduit indicated generally by the numeral 15.

The pump 14 is adapted to be actuated by a small electric motor 16, the drive shaft of which is operatively connected to the impeller of the pump 14 by a magnetic coupling whereby the pump structure is effectively sealed with respect to the drive motor 16. The motor 16 and pump 14 may, for example, be of a commercially procurable construction and the details thereof form no part of the present invention. As clearly illustrated in FIG. 1 the pump discharge conduit 15 extends upwardly, being reversely bent around the upper edge portion of the rear wall of the tank, as indicated at 17 and then downwardly as indicated by the numeral 18, with the lower end thereof being operatively connected to the two tray structures 2a and 2b to supply filtered water to the space beneath the layer of gravel 4, as hereinafter described in detail.

The tank water to be filtered is supplied to the inlet chamber 11 of the filter cartridge 9 by a pair of vertically extending conduits 19a and 19b terminating at their upper ends in reversely bent portions with the free ends thereof extending into the chamber 11, as clearly illustrated in FIG. 4.

The lower ends of the conduits 19a and 19b carry laterally extending tubular members 21a and 21b respectively which are closed at their free outer ends by cap members 22 and communicate at their opposite ends with the respective conduits 19a and 19b. As clearly illustrated in FIG. 1 the members 21a and 21b are provided with a plurality of transversely extending slots 23 therein forming inlet passageways for the tank water which may thus flow into the conduits 19a and 19b and discharged into the chamber 11 of the filter cartridge. The cap members 22 likewise may be provided with slots 24 therein whereby the unfiltered water may be drawn from adjacent the rear wall of the tank substantially throughout the lateral length of the latter.

As hereinafter described in detail the unfiltered water enters the slots 23 and 24, rises upwardly in the conduits 19a and 19b into the filter cartridge, flowing downwardly through the latter and ultimately discharged into the chamber 12 from which it is withdrawn through the pump inlet 13 and discharged from the pump through the conduit 15 from which it is discharged, under pressure, below the gravel layer 4, flowing upwardly through such gravel to the main body of water in the tank.

It will be apparent that as the conduits 19a and 19b have the free inverted ends thereof, extending into the chamber 11, disposed below the normal water level of the main body of water in the tank, as clearly illustrated in FIG. 4, a syphon action results with the water level in the chamber 11 tending to seek the same level as the main body of water in the tank. It will be particularly appreciated that inasmuch as a syphon action is involved, there exists no danger of overflow as filling of the chamber 11 will automatically cease when the level therein reaches that of the water in the tank. Likewise, assuming that the water level in the tank is maintained at its normal level as a result of the periodic addition of make-up water to compensate for evaporation, the surface of the water in the tank will never fall to a level which result in a breaking of the syphon action.

THE GRAVEL SUPPORTING STRUCTURE

Referring to FIGS. 1 through 4, the tray structure 2a and 2b which are of identical general construction, differing only with respect to the position of the inlet for filtered water, each comprise a shallow tray-like base member 25 having a bottom wall 25' and shallow peripheral walls 26, cooperable with partition walls 27 to support a horizontally extending perforated top wall 28. The rear peripheral wall is extended upwardly as indicated in FIG. 2 to form the rear wall 29 cooperable with a generally L-shaped member 31, which forms a front wall 32 and top wall 32' of a supply conduit or plenum section indicated generally by the numeral 33, the ends of which are closed by respective end walls 34.

The components of such tray structures may, for example, be formed from suitable plastic materials with the respective components being suitably secured by solvent welding or other suitable means to form an integral structure.

Secured to each of the top walls 32' of the respective trays 2 is a tubular fitting 35 which forms the inlet for filtered water into the tray structure, the fitting 35 on the tray 2a being disposed adjacent the right end of the associated conduit 33 while the fitting 35 on the tray 26, is disposed adjacent the left end of the associated conduit 33.

As illustrated in FIG. 1 the lower end of the section 18 of the conduit 15 is provided with a T connection 36 having two outlet ends 37a and 37b which are connected in fluid-tight relation to the respective fittings 35 on the tray structures 2a and 2b.

It will be noted that the perforations 38 in the portion of the top wall 28 disposed opposite the wall 33 from inlet ports for the flow of water from the inlet fitting 35 to the respective spaces defined by the ribs or partition walls 27 between the bottom 25 and top wall 28 whereby an efficient distribution of filtered water to the entire area below the top wall 28 is achieved. The expanded perforations 39 in the top wall 28 are of a size to provide adequate water flow therethrough but are smaller in area than the particles of discrete material, such as the usual aquarium gravel, whereby the top wall 28 will effectively retain a layer of discrete material thereon with the water discharged through the perforations 39 flowing upwardly between the interstices of the gravel or other discrete material thereon.

THE EXTERNAL FILTER STRUCTURE

Referring to FIGS. 1 and 4, the casing or body member 8 of the filter structure 7, suitably formed from plastic or other suitable material, comprises a generally vertically extending front wall 41 and a rear wall having offset portions 42a and 42b connected by a rearwardly extending portion 43 whereby the front-to-rear dimension of the clear water chamber 12 is greater than the corresponding dimension of that portion of the housing receiving the filter cartridge 9. Extending outwardly from the front wall 41, adjacent the top edge thereof, is a horizontally extending wall 44, the free outer edge of which extends downwardly to form a flange 45 adapted to engage the upper edge 6 of the aquarium tank and cooperable with a projection 46 extending outwardly from the central portion of the wall 41 to firmly retain the filter structure 7 on the upper edge of the tank as illustrated.

As previously mentioned the pump 14 and motor 16 are of standard constructions, commercially available, and the details thereof form no part of the present invention. In the construction illustrated in FIG. 1, the pump 14 would normally be at least partially formed out of the bottom wall of the chamber 12 with the impeller being separated by a solid wall to effectively seal the pump with respect to the motor. The drive shaft of the motor 16 and impeller of the pump 14 are provided with cooperable magnetic driving and driven coupling members disposed at opposite sides of the sealing wall but magnetically coupled to transmit torque from the drive shaft of the motor to the impeller of the pump.

THE FILTER CARTRIDGE

The filter cartridge 9 is preferably constructed of plastic or other suitable material and is of generally rectangular shape having side walls 47 and end walls 48 and 49, the lateral dimensions of such walls being such that the walls 47 and end wall 49 are generally complemental to the adjacent side and end walls of the casing 8. The end wall 49 of the filter cartridge also forms the dividing wall between the filtering chamber and the clear water chamber 12.

The bottom wall 51 of the cartridge is spaced upwardly from the bottom edges of the adjacent walls 47 and is provided with suitable openings 52 therein to permit the flow of water out of the cartridge into the chamber between the bottom wall of the casing 8 and the bottom wall 51 of the cartridge. The wall 48, as illustrated in FIG. 4 terminates at its lower edge adjacent the bottom wall 51 to provide a fluid discharge port 53 through which the filtered water may flow to the chamber 12. In addition, a plurality of legs 54 may extend downwardly from the bottom 51 to provide further support for the cartridge structure.

Referring to FIG. 1 it will be noted that interposed in the discharge conduit 15 is a valve 55 which may, for example, be an ordinary ball-type valve adapted to be actuated by means of the handle 56 to control the flow of filtered water from the pump 14, the valve being so constructed that the water flow may be adjusted from free flow through the conduit 15 to a lesser amount, for a desired operation of the system.

Extending across the bottom wall 51 of the cartridge 9 is a thin sheet 55 of a suitable material as for example a foam plastic which has relatively fine interconnected pores whereby water may readily pass therethrough but forming a retaining screen for a layer of relatively small particles of filter material 56. Disposed above the layer 56 is a similar layer of relatively large filter particles 57, which may be separated from the particles 56 by a dividing sheet 58 which may, comprise a sheet of the same foam plastic material as the sheet 55 and disposed above the layer 57 is a similar retaining sheet 59 which may be of the same material as the sheets 55 and 58. The sheets 55, 58 and 59, in particular the sheet 59 may be suitably secured to the side walls 47 and end wall 48, 49 whereby the particles of filter material 56 and 57 are effectively retained in the cartridge.

In use the unfiltered water entering at the top of the cartridge passes progressively through the relatively coarse filter material and then through the relatively fine filter material 57 and 56 respectively and is discharged into the chamber 53 at the bottom of the cartridge.

INSTALLATION AND OPERATION

The system is readily installed by placing the tray structures 2a and 2b on the bare bottom of the drained tank, the tray structures being suitably dimensioned to substantially completely cover such bottom, as illustrated in FIG. 1. The filter structure 7 is then positioned on the upper edge 6 of the rear wall of the tank as illustrated and the lower free end 18 of the discharge conduit 15 is connected by means of the T fitting 36 to the respective tray structures 2a and 2b, the ends 37a and 37b of the T portion 36 being connected to the fittings 35 of the respective tray structure to operatively connect the discharge side of the pump 14 to the interior of the respective tray structures.

The tray structures are then covered with a layer 4 of gravel or other discrete material and the tank filled with water. The conduits 19a and 19b and connected elements 21a and 21b are then immersed in the water and permitted to fill completely. When the conduit 19a and member 21a are completely filled, the free upper end thereof is suitably plugged, as for example by means of a cork 61 having a handle 62 rigidly connected therewith, to seal such end, following which the conduit 19a is disposed in operative position as illustrated in FIG. 4 with the free end extending downwardly into the chamber 11 of the cartridge 9. The cork 21 is then carefully withdrawn to permit the discharge of water into the cartridge. This operation is then repeated with respect to the conduit 19b and associated member 21b.

Following the addition of fish, plant life, and other objects into the aquarium the electric motor 16 may be started and the valve 55 initially adjusted for maximum water flow. Filtered water will thus enter the inlet 13 of the pump and be discharged into the tray structures 2a and 2b from which it will flow upwardly through the perforations 39 therein and through the layer of gravel 4 into the main body of water. The valve 55 is then adjusted to provide a suitable flow. In most cases the valve 55 may be adjusted to provide maximum flow without disturbance to plants and fish in the aquarium. The respective components are preferably so proportioned that with maximum water flow the water level in the chamber 12 will be approximately one inch in height while the water level in the cartridge chamber 11 will normally be at least approximately a quarter of an inch below the normal water level in the tank and at least approximately a quarter of an inch above the discharge end of the conduit 19a or 19b.

Tests have shown that with a pump having a capacity, in operation under the conditions described, of 1 ⅓ gallons per minute, excellent results are obtainable in a 10 gallon tank with the valve 55 set to provide a flow of one-half gal./min, which would give complete turnover of the tank volume every 20 minutes. Consequently, in the absence of unusual circumstances, a 60 gallon tank could have a complete volume turnover in less than an hour, which would be a satisfactory rate for a tank this size to produce adequate biofiltration, and enabling the use of the system described with tanks of from 10 to 60 gallons. The invention is, of course, applicable to larger tanks by the use of corresponding larger components.

It will be appreciated that the construction illustrated and described inherently provides adequate safety features whereby there is no danger whatsoever of an overfilling of the filter structure with overflow exteriorly of the tank, as the water level within the cartridge structure can rise only to a maximum corresponding to the water level within the aquarium tank. This operation likewise is completely independent of the pump whereby failure of the pump will have no material effect thereon.

The construction of the tray structures 2a and 2b is such that substantially uniform water flow is effected through the gravel throughout the area thereof, creating a very effective water circulation in the tank. At the same time the capacity of the pump 14 is such that a complete change of tank water may be effected in short periods of time as previously described.

MODIFIED TRAY STRUCTURE

As previously mentioned, the tray structures 2a and 2b are preferably dimensioned to accommodate the average ten gallon tank and while each tray section may be provided with its own inlet fitting 35, as illustrated in FIG. 1, where more than 2 tray structures are involved it may be desirable to provide additional means for operatively connecting all tray structures with the discharge side of the pump 14.

FIGS. 5 through 8 illustrate a construction for use with three tray structures 2c, 2d and 2e, illustrated in plan in FIG. 5. The tray structures 2d and 2e are generally identical in construction with the exception of the position of the water inlet thereto and likewise are identical with the tray structures 2a or 2b with the exception of the position of the water inlet. With respect to the tray 2d, as illustrated in FIG. 6, the inlet is disposed at the right-hand end of the plenum conduit 33d and is formed by elimination of the adjacent end wall 34. The tray structure 2e is identical with the exception that instead of providing an open end at the right end of the plenum conduit 33d, the open end is provided at the left end thereof.

The center tray section 2c is provided with a plenum conduit 33' which receives filtered water through the fitting 35 and distributes such water to the plenum conduits 33d and 33e as well as to a plenum conduit 33c for the tray 2c. The top wall of the conduits 33' and 33c are formed by the top wall 32' of an angle member 31' while the front wall of the conduit 33c is formed by the depending wall 32 of such angle member. A vertical wall 63 of an angle member 64 forms the dividing partition wall between such conduits while the horizontally extending wall 63' thereof forms the bottom wall of the conduit 33'. To effect a connection between the conduits 33d and 33e with the conduit 33' the opposite ends of the conduit 33' are provided with respective inverted U-shaped connector members 65, rigidly secured thereto and adapted to mate with the interior surfaces of the open ends of the respective conduits 33d and 33e. The conduit 33c is operatively connected to the supply conduit 33' by an opening 66 in the vertical wall of the angle member 64. Thus filtered water entering the fitting 35 may flow into the conduit 33' from which it is conducted to the respective conduits 33d and 33e at opposite ends of the conduit 33' and to the conduit 33' and to the conduit 33c through the opening 63.

Obviously where more than three tray structures are employed the additional tray structures may be supplied independently, as for example as illustrated in FIG. 1, or in some cases it may be desirable to employ a plurality of tray sections constructed in the same manner as the section 2c but omitting an inlet fitting 35 and connecting such tray structure intermediate two tray structures such as 2d and 2c.

MODIFIED FILTER STRUCTURE

While the pump and motor assembly illustrated in FIG. 1 would appear to be suitable for most applications, such construction does require a specially designed casing 8 to accommodate the necessary magnetic coupling elements and in some cases it may be deemed desirable to utilize a standard pump and motor assembly as commercially procurable. Such a construction is illustrated in FIG. 9 in which the motor 16' and pump 14 are constructed as an integral unit which is provided with a vertically extending inlet structure of generally tubular configuration having an enlarged perforated base portion which is adapted to seat on the bottom of the casing 7', thus also forming a support for the motor and pump assembly. In this construction the discharge port is disposed at the opposite side of the pump structure, adjacent the motor 16' and is connected by a short conduit section 15' to the valve 55. The cartridge 9 and remaining structure is constructed in the same manner as heretofore described with respect to the construction of FIG. 1 and the general operation the filter structure of FIG. 9 is identical with that of FIG. 1.

It will be appreciated from the above description that I have provided a comparatively simple yet highly efficient filter system for aquarium tanks and the like, utilizing aerobic action, in effect providing a sewage disposal system for an aquarium tank having an efficiency which insures crystal water at all times as well as substantially eliminating the problem of periodic cleaning of the tank and in particular the removal of waste matter accummulating in the gravel bed at the bottom of the tank. At the same time, the construction inherently provides safety features which eliminates any possibility of an overflow of water exteriorly of the filter structure.

I claim:

1. A filter system for aquariums and the like, utilizing aerobic action, comprising a filter structure adapted to be disposed exteriorly of the body of water in the aquarium tank, said filter structure having a water inlet adapted to operatively communicate with water in the aquarium tank, and a water outlet, a pump adapted to deliver water under pressure, a tray-like structure, upon which discrete material may be supported, adapted to lie on the bottom of the aquarium tank, said tray-like structure being adapted to form a plurality of independent closed chambers at the bottom of the aquarium tank and beneath the surface of said tray, closed conduit means in communication with said pump and said plurality of independent closed chambers, the surface of said tray-like structure having openings therein adapted to operatively communicate with the main body of water, with said openings being adapted to form the only water outlets for the respective chambers and disposed to provide relatively uniform flow and distribution therefrom, said closed conduit means operatively connecting the filter outlet to the respective chambers for supplying filtered water, in approximately equal volumes to the respective independent chambers under sufficient pressure to force the returning water upwardly relatively uniformly into the main body of water with sufficient force to provide a flushing action with respect to said tray-like structure sufficient to flush debris and foreign material into the main body of water for ultimate withdrawal and accumulation in said filter.

2. A filter system for aquariums and the like, utilizing aerobic action, comprising a filter structure adapted to be disposed exteriorly of the body of water in the aquarium tank, said filter structure having a casing in which is disposed a filter body, the top of which is provided with a water inlet and the bottom of which is provided with a water outlet, said casing being constructed to form a water chamber laterally adjacent the filter body and communicating with the outlet in the bottom thereof, a tray-like structure, adapted to lie on the bottom of the aquarium tank, said tray-like structure having side and opposed top and bottom walls forming at least one closed chamber, the upper surface of said opposed top wall being adapted to support discrete material, partition means extending between said opposed top and bottom walls and dividing the chamber into a plurality of respective independent sections, the top walls of said sections defining substantially equal areas and having openings therein for providing a relatively uniform flow throughout the area of a section, with such openings being adapted to form the only water outlets for the respective section, closed conduit means forming a supply and distribution conduit extending adjacent an edge of the tray-like structure, said conduit having a water inlet opening therein for the supply of filtered water, under pressure, thereto, said supply and distribution conduit adapted to have passageways therein for the distribution of approximately equal volumes of water therefrom to each respective section, an impeller type water pump having a suction side and a pressure side, the suction side of said pump being operatively disposed in the lower portion of said water chamber for withdrawing water therefrom, closed conduit means connecting the pressure side of said pump to the water inlet opening of the distribution conduit, means for actuating said pump, said filter structure being constructed for external mounting on an aquarium with the top of the filter body so disposed below the surface of the main body of water in the aquarium that the surface of such main body represents the maximum head of water above the filter body, syphon means operatively connecting the main body of water and the top of the filter body, and manually adjustable valve means in said conduit at the pressure side of said pump for controlling the water volume discharged by said pump, whereby such volume may be so adjusted that the water level in said water chamber may be operatively maintained at a height intermediate the pump inlet and the surface of the body of water above said filter body to provide a pressure head thereacross, and at the same time the water supplied to said tray-like structure will be forced upwardly relatively uniformly into the main body of water with sufficient force to provide a flushing action with respect to said tray-like structure, sufficient to flush debris and foreign material into the main body of water for ultimate withdrawal and accumulation in said filter.

3. A filter system according to claim 2, wherein said supply conduit is disposed adjacent the rear edge of said tray-like structure and above the latter, with the top wall thereof forming the bottom wall of such conduit and openings in such wall forming the supply passageways for the respective sections thereof.

4. A filter system according to claim 3, wherein said tray-like structure comprises an intermediate tray-like member and a similar member at each side thereof forming three closed chambers, each being divided into respective independent sections, and each tray-like member having a supply conduit, and a plenum conduit carried by said intermediate tray member having a water inlet for connection to the pressure side of said pump, and having outlets therein communicating with the respective supply conduits of the individual tray members.

5. A filter system according to claim 2, wherein said tray-like structure comprises a plurality of individual tray-like members cooperable to cover the entire bottom area of an aquarium tank, each having a water inlet for the supply of filtered water thereto.

6. A filter system for aquariums and the like, utilizing aerobic action, comprising a filter structure adapted to be disposed exteriorly of the body of water in the aquarium tank, said filter structure having a water inlet adapted to operatively communicate with water in the aquarium tank and a water outlet, a tray-like structure, adapted to lie on the bottom of the aquarium tank, said tray-like structure having side and opposed top and bottom walls forming at least one closed chamber, the upper surface of said opposed top wall being adapted to support discrete material, partition means extending between said opposed top and bottom walls and dividing the chamber into a plurality of respective independent sections, the walls of said sections operatively bonding on the main body of water defining substantially equal areas and having openings therein for providing a relatively uniform flow throughout the area of a section, with such openings adapted to form the only water outlets for the respective sections, closed conduit means forming a supply and distribution conduit extending adjacent an edge of the tray-like structure, said supply and distribution conduit having a water inlet opening therein for the supply of filtered water, under pressure, thereto, said supply and distribution conduit adapted to have passageways therein for the distribution of approximately equal volumes of water therefrom to each respective section, means operatively connecting said filter outlet to the water inlet conduit, for supplying water under pressure to said tray-like structure whereby such water will be forced upwardly relatively uniformly into the main body of water with sufficient force to provide a flushing action with respect to said tray-like structure, sufficient to flush debris and foreign material into the main body of water for ultimate withdrawal and accumulation in said filtering step.

7. A filter system according to claim 6, wherein said supply conduit is disposed adjacent the rear edge of said tray-like structure and above the latter, with the top wall thereof forming the bottom wall of such conduit and openings in such wall forming the supply passageways for the respective sections thereof.

8. A filter system according to claim 7, wherein said tray-like structure comprises an intermediate tray-like member and a similar member at each side thereof forming three closed chambers, each being divided into respective independent sections, and each tray-like member having a supply conduit, and a plenum conduit carried by said intermeidate tray member having a water inlet for connection to said water supply means, and having outlets therein communicating with the respective supply conduits of the individual tray members.

9. A filter system according to claim 7, wherein said tray-like structure comprises a plurality of individual tray-like members cooperable to cover the entire bottom area of an aquarium tank, each having a water inlet for the supply of filtered water thereto.

* * * * *